(12) United States Patent
Huang

(10) Patent No.: US 6,999,106 B2
(45) Date of Patent: Feb. 14, 2006

(54) REDUCING THE BIAS ON SILICON LIGHT MODULATORS

(75) Inventor: Samson X. Huang, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 09/846,065

(22) Filed: Apr. 30, 2001

(65) Prior Publication Data

US 2002/0158891 A1 Oct. 31, 2002

(51) Int. Cl.
*G09G 5/10* (2006.01)

(52) U.S. Cl. ............................................. 345/690
(58) Field of Classification Search ............... 345/690,
345/89, 204, 95, 87, 96, 98, 84, 100, 211,
345/32, 93; 347/239; 349/28, 117, 112,
349/149, 34, 38; 359/263, 265, 267; 315/169.3,
315/291

See application file for complete search history.

(56) References Cited

U.S. PATENT DOCUMENTS

| | | | | |
|---|---|---|---|---|
| 4,763,996 A | * | 8/1988 | Hara et al. | 359/249 |
| 4,828,368 A | * | 5/1989 | Efron et al. | 359/263 |
| 4,859,911 A | * | 8/1989 | Kinnard et al. | 315/169.3 |
| 4,978,951 A | * | 12/1990 | Knapp | 345/93 |
| 5,073,010 A | * | 12/1991 | Johnson et al. | 349/28 |
| 5,177,475 A | * | 1/1993 | Stephany et al. | 345/96 |
| 5,500,538 A | | 3/1996 | Yamazaki et al. | 257/49 |
| 5,510,824 A | * | 4/1996 | Nelson | 347/239 |
| 5,552,912 A | * | 9/1996 | Sharp et al. | 349/117 |
| 5,940,055 A | * | 8/1999 | Lee | 345/87 |
| 5,999,234 A | * | 12/1999 | Budd et al. | 349/38 |
| 6,226,058 B1 | * | 5/2001 | Ohi | 349/38 |
| 6,329,971 B1 | * | 12/2001 | McKnight | 345/95 |
| 6,346,778 B1 | * | 2/2002 | Mason et al. | 315/291 |
| 6,356,327 B1 | * | 3/2002 | Moore | 349/139 |
| 6,369,832 B1 | * | 4/2002 | McKnight | 345/691 |
| 6,373,543 B1 | * | 4/2002 | Cacharelis | 349/123 |
| 6,388,649 B1 | * | 5/2002 | Tanaka et al. | 345/89 |
| 6,388,661 B1 | * | 5/2002 | Richards | 345/204 |
| 6,388,697 B1 | * | 5/2002 | Sonehara et al. | 347/239 |
| 6,392,734 B1 | * | 5/2002 | Gregory | 349/153 |
| 6,501,454 B1 | * | 12/2002 | Ozawa et al. | 345/96 |
| 6,657,609 B1 | * | 12/2003 | Starr | 345/94 |
| 6,731,272 B1 | * | 5/2004 | Huang | 345/204 |
| 2002/0079849 A1 | * | 6/2002 | Mason et al. | 315/291 |
| 2002/0097215 A1 | * | 7/2002 | Huang | 345/98 |
| 2002/0175887 A1 | * | 11/2002 | Yamazaki | 345/87 |
| 2003/0063047 A1 | * | 4/2003 | Starr | 345/32 |
| 2003/0112383 A1 | * | 6/2003 | Kim | 349/43 |
| 2003/0122768 A1 | * | 7/2003 | Oton et al. | 345/96 |
| 2003/0206263 A1 | * | 11/2003 | Hinata | 349/149 |
| 2004/0046727 A1 | * | 3/2004 | Fujioka et al. | 345/98 |

FOREIGN PATENT DOCUMENTS

EP 0 475 612 A2 3/1992
EP 0 789 346 A1 8/1997

* cited by examiner

*Primary Examiner*—Vijay Shankar
*Assistant Examiner*—Prabodh Dharia
(74) *Attorney, Agent, or Firm*—Trop, Pruner & Hu, P.C.

(57) ABSTRACT

A negative bias voltage may be utilized to bias a spatial light modulator and to enable the spatial light modulator to be modulated using relatively low supply voltages. During the negative frame, a positive bias voltage may be utilized and during the positive frame, a negative bias voltage may be utilized. This avoids damage to the liquid crystal material. The necessary modulating voltages may be within the range available from leading edge silicon technologies.

10 Claims, 3 Drawing Sheets

REDUCING THE BIAS ON SILICON LIGHT MODULATORS

BACKGROUND

This invention relates generally to silicon light modulators.

A silicon light modulator or SLM uses an electric field to modulate the orientation of a liquid crystal (LC) material. By the selective modulation of the liquid crystal material, an electronic display may be produced.

The orientation of the LC material affects the intensity of light going through the LC material. Therefore, by sandwiching the LC material between a reflective electrode and a transparent top plate, the optical properties of the LC material may be modulated.

In particular, by changing the voltage applied across the electrodes, the intensity of the light being reflected by the reflective electrode may be modulated, thereby changing its gray level value. When light is shined on the cell, the reflected light can produce an image on a screen. By changing the voltage level on the electrodes, the image can be altered.

Generally, a silicon light modulator includes a transparent conducting layer that acts as the top plate and a pixel electrode that acts as the reflective electrode. As the voltage on the pixel electrode changes, the reflected light intensity from the pixel area changes accordingly.

A transfer function, shown in FIG. 5, describes the relationship between the voltage applied and the resulting light brightness. As the voltage increases, the pixel brightness or gray scale generally increases too. A number of gray scale levels may be represented, such as 256 levels, by dividing the available voltage up accordingly.

However, typical liquid crystal material needs a relatively high voltage for modulation. Generally the upper level of top plate voltage, $V_b$, is between 3.3 and 10 volts.

The supply voltage of modern silicon chips is moving downwardly from 2.5 volts towards 1.3 volts and potentially lower thereafter. Therefore, leading edge integrated circuit chips may not have the sufficient voltage levels to modulate typical liquid crystal materials. This may adversely affect the ability to integrate displays into silicon chips.

Thus there is a need for better ways to use available voltage levels, such as voltage levels associated with leading edge integrated circuit chips, for modulating liquid crystal displays.

DETAILED DESCRIPTION

Figure 1:
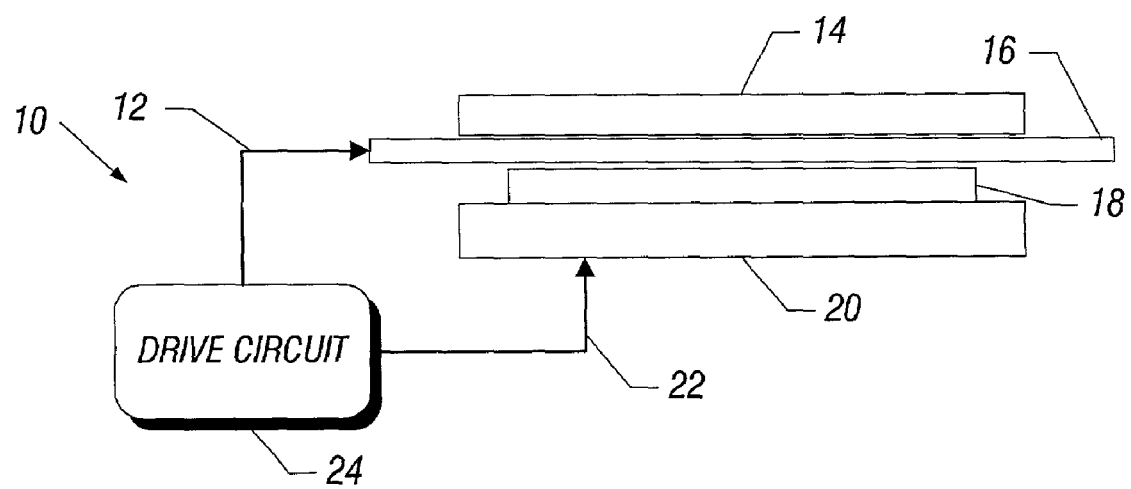
FIG. 1 is a schematic depiction of one embodiment of the present invention.

Referring to FIG. 1, a spatial light modulator 10 includes a liquid crystal layer 18. The liquid crystal layer 18 is sandwiched between a pixel electrode 20 and a transparent top plate 16. For example, the top plate 16 may be made of a transparent conducting layer such as indium tin oxide (ITO). Applying voltages across the liquid crystal layer 18 through the top plate 16 and pixel electrode 20 allows the reflectivity of the spatial light modulator 10 to be altered. A glass layer 14 may be applied over the top plate 16. In one embodiment, the top plate 16 may be fabricated directly onto the glass layer 14.

A drive circuit 23 applies bias potentials 12 and 22 to the top plate 16 and pixel electrode 20 respectively. In one embodiment, a liquid crystal over silicon (LCOS) technology may be used.

Figure 2:
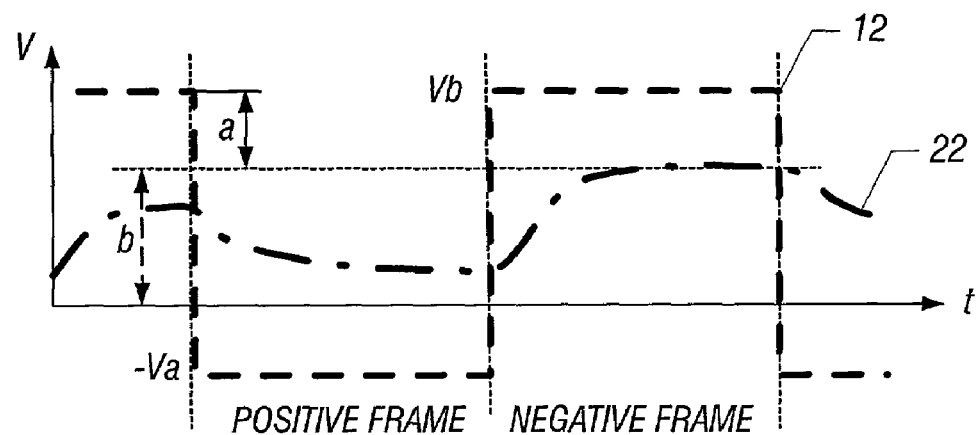
FIG. 2 is a hypothetical graph of applied voltage versus time for a spatial light modulator.

Referring to FIG. 2, the drive signal 12 is applied to the top plate 16 and the drive signal 22 is applied to the pixel electrode 20. During a positive frame, a signal 12 of $-V_a$ is applied to the top plate 16. During the negative frame, a voltage of $V_b$ is applied to the top plate 16. At the same time, the pixel electrode voltage 22 is applied. The voltage 22 reaches a peak equal to the voltage level b during the negative frame. The difference between the voltage level b and the voltage $V_b$ is indicated as the voltage a.

Thus, to provide a hypothetical example, if a liquid crystal material 18 has a 3.3 volt modulation voltage. The level b is equal to 1.8 volts. In the positive frame, the top plate 16 is biased to −1.5 volts (i.e., $V_a$=1.5 volts). In the negative frame, the top plate 16 may be biased to 3.3 volts (i.e., $V_b$=3.3 volts).

Figure 3:
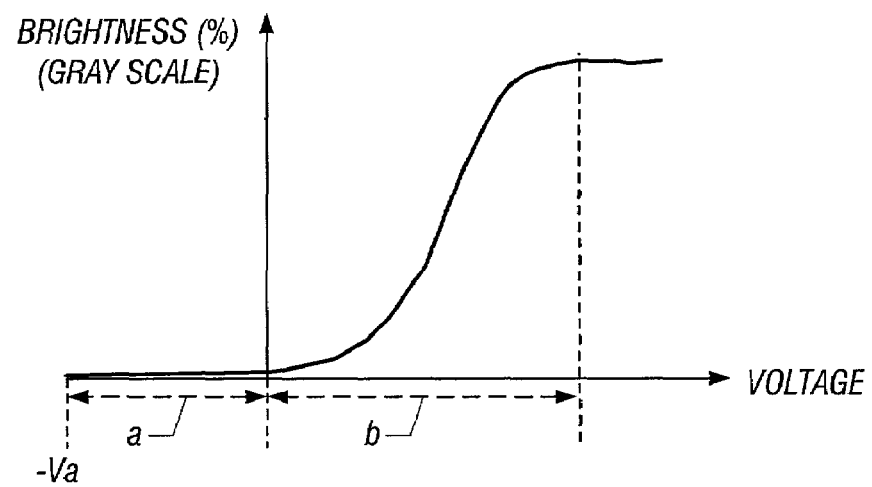
FIG. 3 is a graph of brightness versus bias voltage during a positive frame in accordance with one embodiment of the present invention.

Referring to FIG. 3, which shows the positive frame, the dynamic range is equal to b volts. If the spatial light modulator's supply voltage is a voltage equal to or higher than b volts, full modulation may be achieved by biasing the top plate to $-V_a$ volts in the positive frame. By using a negative voltage to bias the top plate 16, the entire dynamic voltage range (b volts) may be utilized while enabling lower overall supply voltages to be utilized for modulation. Conventional designs may have negative frame voltage as high as the voltage a plus the voltage b.

Figure 4:
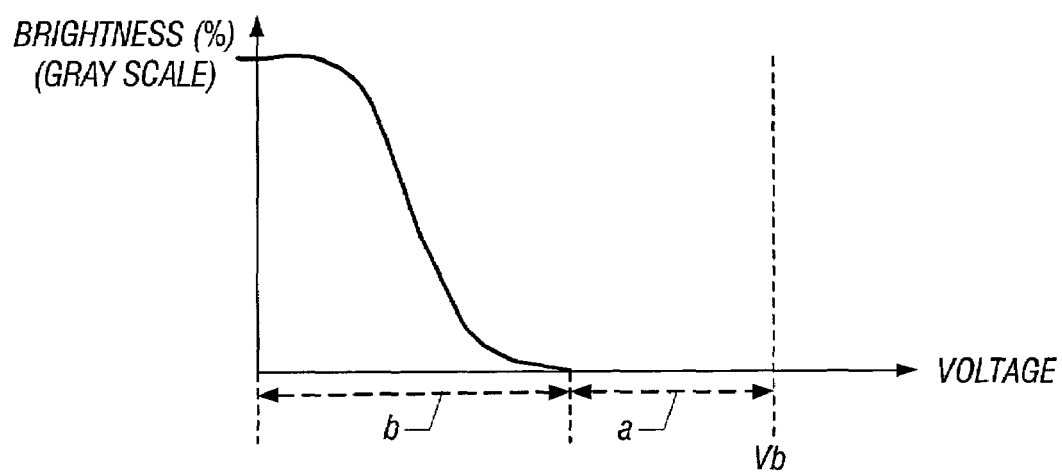
FIG. 4 is a graph of brightness versus bias voltage during a negative frame in accordance with one embodiment to the present invention.
Figure 5:
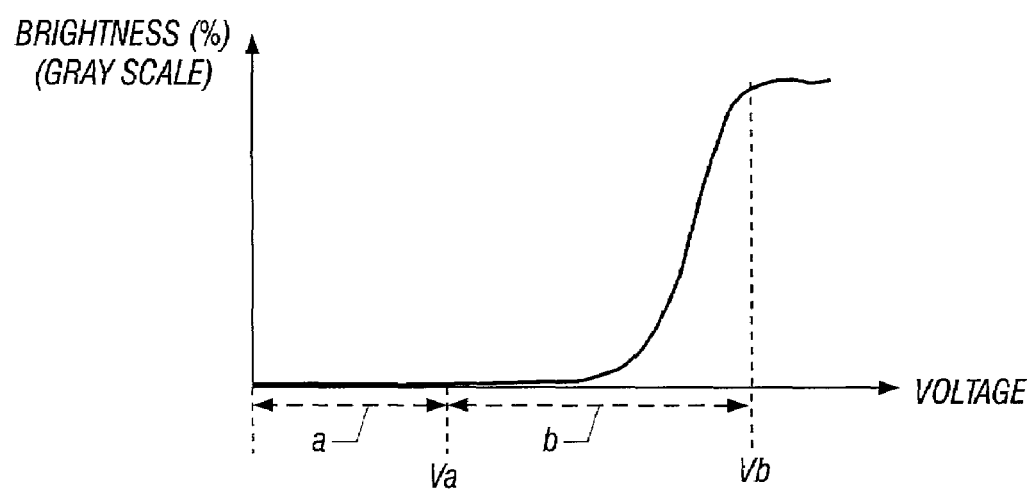
FIG. 5 is a graph of brightness versus bias voltage in accordance with a prior art embodiment.

Because the liquid crystal material 18 should not generally be biased only in the positive direction to avoid damage, the liquid crystal bias direction is altered on alternating frames. In the negative frame, the top plate 16 voltage may be $V_b$ as shown in FIG. 4. The spatial light modulator voltage still swings between zero and b volts. The corresponding gray scale is also reversed. As a result, zero volts produces the highest brightness and b volts produces the lowest brightness, as shown in FIG. 4.

Thus, leading edge semiconductor supply voltages may be utilized to bias liquid crystal materials that would otherwise require supply voltages beyond those available with ever decreasing leading edge semiconductor supply voltages. As a result, an effective liquid crystal device may be achieved using existing and future silicon technologies. This may facilitate the integration of silicon and display technologies.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A spatial light modulator comprising:
   a top plate;
   a liquid crystal layer;
   a pixel electrode, said top plate and said pixel electrode sandwiching said liquid crystal layer; and a drive circuit to apply positive and negative bias potentials in alternating frames, said circuit to apply positive potential during a negative cycle of liquid crystal modulation and apply negative potential during a positive cycle of liquid crystal modulation to said top plate and to bias the pixel electrode with only a positive potential during both the positive and negative cycles of liquid crystal modulation.

2. The spatial light modulator of claim 1 including a drive circuit to apply a negative bias potential to said top plate.

3. The spatial modulator of claim 1 wherein said spatial light modulator is a liquid crystal over silicon spatial light modulator.

4. The spatial light modulator of claim 2 wherein said top plate is formed of indium tin oxide.

5. A method comprising:
   biasing a first plate of a spatial light modulator with positive and negative bias potentials in alternating frames by using signals of a first polarity during a positive cycle of liquid crystal modulation and a second polarity during a negative cycle of liquid crystal modulation; and
   biasing a second plate of said spatial light modulator with only the second polarity during both the positive and negative cycles of liquid crystal modulation.

6. The method of claim 5 including biasing a top plate and a pixel electrode.

7. The method of claim 6 including biasing said top plate to a negative voltage.

8. The method of claim 7 including maintaining said pixel electrode at a positive voltage.

9. The method of claim 8 including biasing said pixel electrode across its full dynamic range.

10. The method of claim 5 including alternately biasing the top plate negatively and positively.

* * * * *